United States Patent
He et al.

(10) Patent No.: US 11,919,543 B2
(45) Date of Patent: Mar. 5, 2024

(54) MULTI-MODE PERSONAL TRANSPORTATION AND DELIVERY DEVICES AND METHODS OF USE

(71) Applicant: Ford Global Technologies, LLC, Dearborn, MI (US)

(72) Inventors: Edmund Pengfei He, Troy, MI (US); Chelsia Ka Po Lau, Ann Arbor, MI (US); James Yu-Hsin Kuo, Farmington Hills, MI (US); Joseph Ian Halaszynski, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 364 days.

(21) Appl. No.: 17/407,473

(22) Filed: Aug. 20, 2021

(65) Prior Publication Data

US 2023/0055354 A1 Feb. 23, 2023

(51) Int. Cl.
*B60W 60/00* (2020.01)
*G06Q 10/0835* (2023.01)
*G06Q 50/30* (2012.01)

(52) U.S. Cl.
CPC . *B60W 60/00256* (2020.02); *G06Q 10/08355* (2013.01); *B60L 2200/24* (2013.01); *B60W 2510/244* (2013.01); *B60W 2556/50* (2020.02); *G06Q 50/30* (2013.01)

(58) Field of Classification Search
CPC ..... B60W 60/00256; B60W 2510/244; B60W 2556/50; G06Q 10/08355; G06Q 50/30; B60L 50/60; B60L 53/65; B60L 53/66; B60L 2200/24; B60L 2200/36; B60L 2240/622; B60L 2260/32; Y02T 10/70; Y02T 10/7072

See application file for complete search history.

(56) References Cited

U.S. PATENT DOCUMENTS

| | | |
|---|---|---|
| 9,552,564 B1 | 1/2017 | Martenis |
| 9,778,653 B1 | 10/2017 | McClintock et al. |
| 10,405,215 B2 | 9/2019 | Tavares Coutinho et al. |
| 10,551,851 B2 | 2/2020 | Yu et al. |

(Continued)

OTHER PUBLICATIONS

A.M. Saikin, "Perspectives of the unmanned cargo transport with electric traction development under the conditions of the Russian Federation", IOP Conference Series: Materials Science and Engineering, Special Programs Department FSUE "NAMI", Moscow, Russian Federation, 2019, 10 pages.

*Primary Examiner* — Abby Y Lin
*Assistant Examiner* — Karston G. Evans
(74) *Attorney, Agent, or Firm* — Brandon Hicks; Eversheds Sutherland (US) LLP

(57) ABSTRACT

Multi-mode personal transportation and delivery devices and methods of use are disclosed herein. A device can include a communications interface, the communications interface configured to provide vehicle-to-everything communications, a device controller comprising: a processor; and a memory for storing instructions, the processor executing the instructions to: receive a first message from a service provider that the transportation device is to relocate to a location based on user demand; and activate a redistribution mode to cause the transportation device to autonomously navigate to the location.

6 Claims, 7 Drawing Sheets

(56) References Cited

U.S. PATENT DOCUMENTS

| | | | |
|---|---|---|---|
| 2012/0323365 A1* | 12/2012 | Taylor | G05D 1/0242 |
| | | | 901/1 |
| 2015/0006005 A1* | 1/2015 | Yu | B60P 3/007 |
| | | | 701/22 |
| 2017/0123421 A1* | 5/2017 | Kentley | G05D 1/0088 |
| 2018/0010915 A1* | 1/2018 | Wilhelm | G01C 21/20 |
| 2018/0376357 A1* | 12/2018 | Tavares Coutinho | |
| | | | H04W 64/003 |
| 2019/0019118 A1* | 1/2019 | Xi | G06Q 10/04 |
| 2019/0102730 A1* | 4/2019 | Giorgi | H04L 67/12 |
| 2019/0206264 A1* | 7/2019 | Todasco | G08G 5/0069 |
| 2020/0180433 A1* | 6/2020 | Hou | B62K 15/006 |
| 2021/0394662 A1* | 12/2021 | Deng | G06Q 50/30 |
| 2022/0017121 A1* | 1/2022 | McLean | G06V 20/593 |

* cited by examiner

MULTI-MODE PERSONAL TRANSPORTATION AND DELIVERY DEVICES AND METHODS OF USE

BACKGROUND

Micro-mobility device operators employ juicers (e.g., individuals) to collect and charge batteries of shared mobility devices after use. Juicers can also redistribute shared mobility devices to areas with high demand. The cost of human labor is high and the methods of collecting devices are less than ideal. The process of charging a battery is time-consuming and the complete manual labor processes are not efficient or scientific.

BRIEF DESCRIPTION OF THE DRAWINGS

The detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1A:
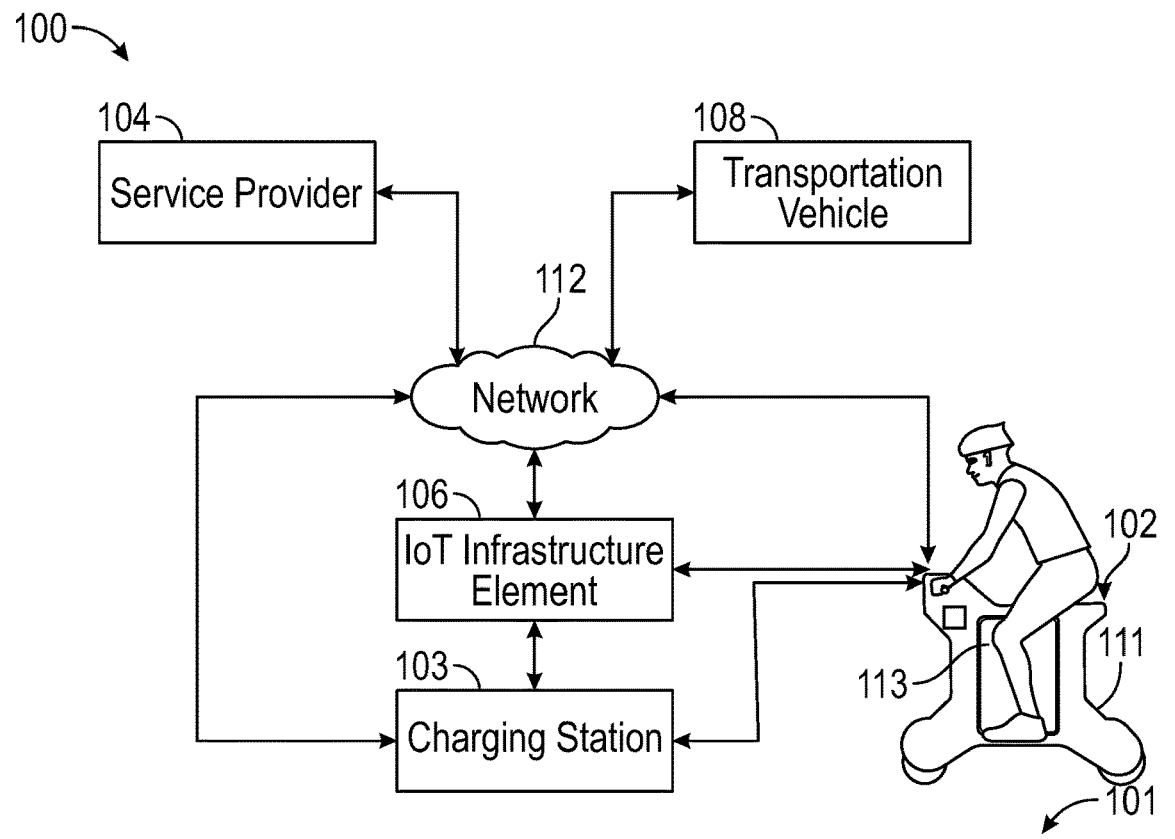
FIGS. 1A and 1B illustrate an example architecture where the systems and method of the present disclosure may be practiced.
Figure 1A:
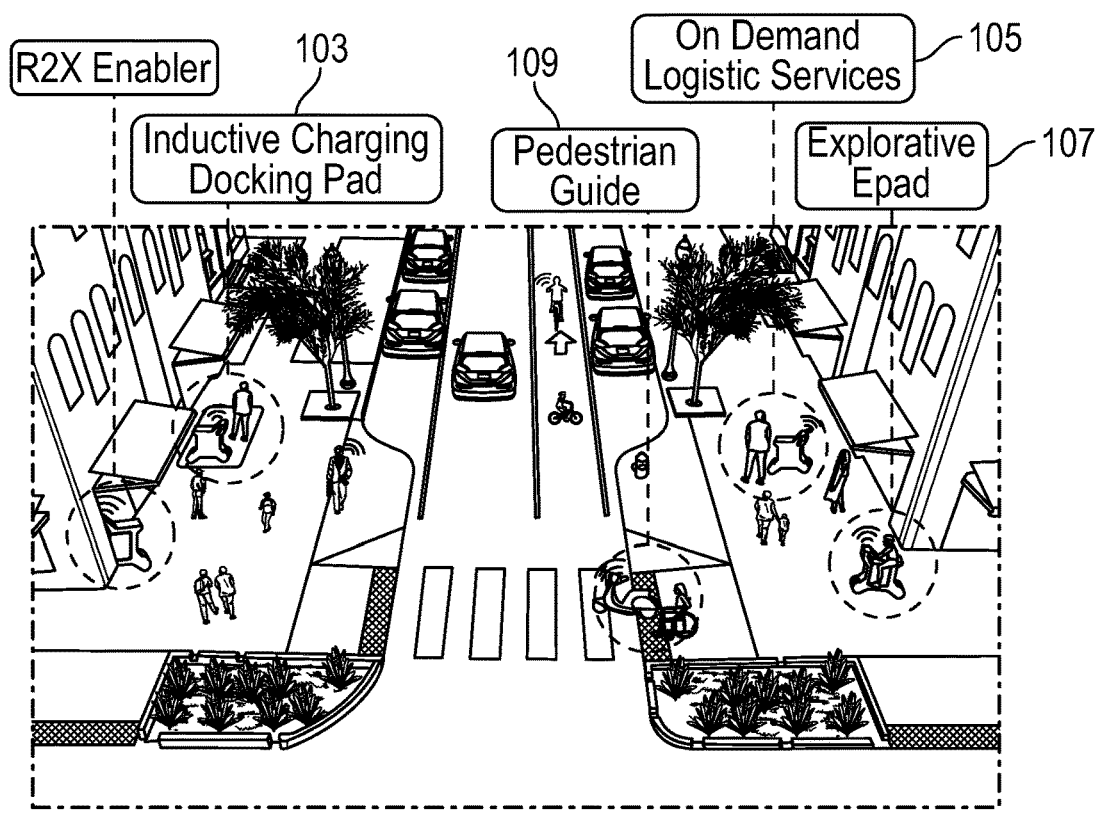

The present disclosure pertains to multi-mode transportation devices that are capable of performing autonomous delivery tasks and transporting users. An example transportation device can be automatically redistributed to areas in a location where user demand is high. When longer travel distances are required, the transportation device can communicate with transportation infrastructure and leverage transportation networks (for example, buses) to enable extended migrations to a destination location.

The transportation device can utilize V2X (Vehicle-to-Everything) communications when operating autonomously and interacting with IoT (internet of things) enabled elements. Example IoT objects can include, but are not limited to, sensors, devices, access points, beacons and the like which may be integrated into infrastructure such as office buildings, residential buildings, businesses, lights, etc. The transportation device can operate in various modes such as redistribution mode, delivery mode, charging mode, power-saving mode, and the like. In a redistribution mode the transportation device may travel to a new location if scooter distribution is desired based on demand or usage. In a delivery mode, the transportation device may enter buildings and communicating with security systems and elevators. The transportation device may utilize authorization and/or access credentials to enter private areas. The transportation device may be capable of self-parking and self-charging on sidewalks, such as designated areas with a charging cord or charging pad, when in a charging mode.

If the transportation device senses its state-of-charge (SoC), for example, a battery of the transportation device falls below a SoC threshold, then the transportation device may automatically transport itself to a wireless charging pad to charge. The transportation device may be capable of acting as an assistant, such as a guide for the blind, elderly, impaired and so forth to help them cross busy streets or to a specified location. In one example, a transportation device can be used to power a wheelchair up a hill or cross a street in a timely and safe manner. The road conditions that present potential risks to the transportation device may be identified by the transportation device using data collected real-time from traffic and city infrastructures, other transportation devices, vehicles, etc.

The frame of the transportation device can include a swappable capsule box that can be detached when the transportation device is not in a logistic mode. A capsule box can include any container that may be associated with the transportation device. The capsule box can be configured to receive and retain items or objects. For example, the capsule box can retain belongings of riders who are using the transportation device. In another example, the capsule box can receive and retain a package for delivery to a destination. A first user can load a package into the capsule box and the transportation device can autonomously deliver the package to a destination where the package is removed from the capsule box by a second user (e.g., recipient). In one example, the first user can ride the transportation device to a delivery location and deliver the package. The delivery location could be a waypoint on the way to a terminal destination for the first user. In one example, the first user may drive the transportation device to a bus stop (e.g., terminal destination). Along the way, the first user can stop at a delivery location and deliver the package to the second user.

In some instances, the transportation device can be configured as an autonomous delivery e-scooter. The transportation device can be a dual-mode vehicle frame capable of riding and performing autonomous delivery tasks. The transportation device can function as a shareable electric micro-mobility device for short personal transportation around a location. The transportation device can be switched to delivery mode to deliver objects such as packages or food, autonomously and on-demand.

Illustrative Embodiments

Figure 1B:
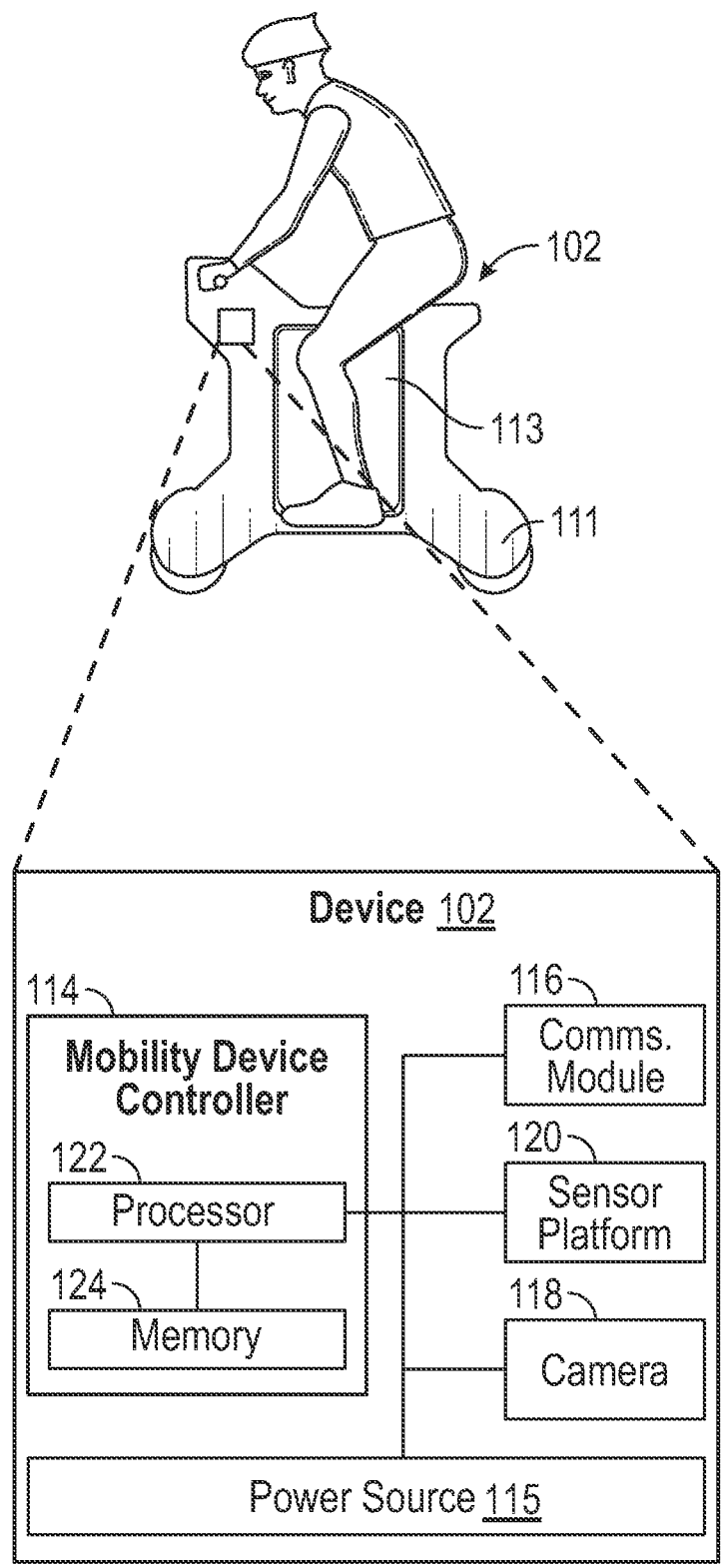
Figure 2:
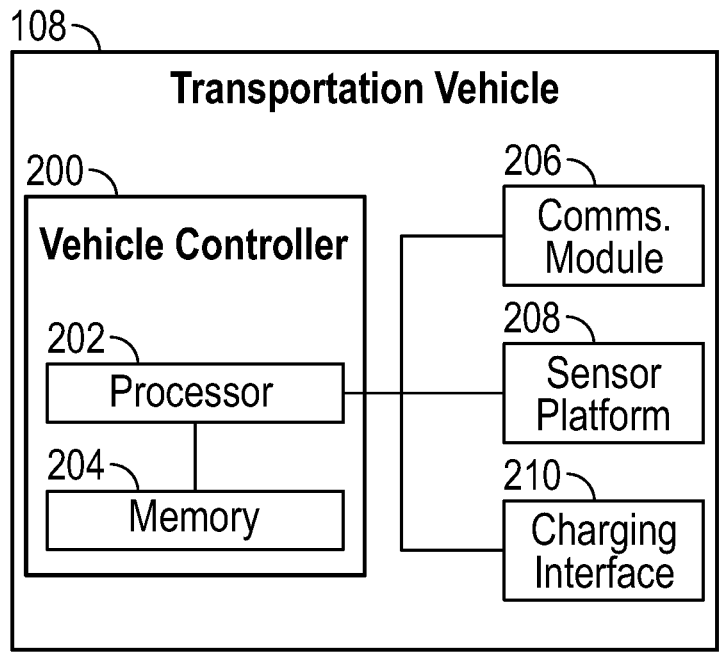
FIG. 2 illustrates an example use case where a transportation device is communicating with a transportation vehicle during redistribution.
Figure 2:
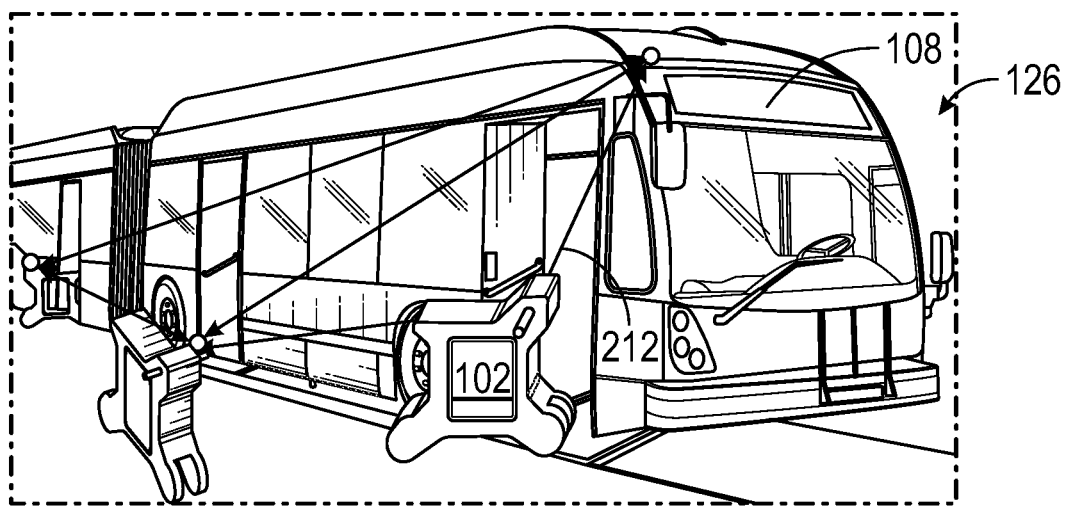

Turning now to the drawings, FIGS. 1A, 1B, and 2 collectively depict an illustrative architecture 100 in which techniques and structures of the present disclosure may be implemented. The architecture 100 includes an example operating environment 101 illustrating various use cases for a multi-mode transportation device (hereinafter device 102). The operating environment 101 can include a charging station 103 where the device 102 can recharge. The device 102 can function as an on-demand logistic service 105, as an explorative epad 107, and as a pedestrian guide 109. These functions are in addition to the device 102 being configured for use as a ride mobility service. Each of these use cases is described in greater detail with reference to FIGS. 2-6.

The architecture 100 can also include a service provider 104, an IoT infrastructure element 106, a transportation vehicle 108, and a network 112. Some or all of these components in the architecture 100 can communicate with one another using the network 112. The network 112 can include combinations of networks that enable the components in the architecture 100 to communicate with one another. The network 112 may include any one or a combination of multiple different types of networks, such as cellular, cable, the Internet, wireless networks, and other private and/or public networks. In some instances, the network 112 may include cellular, Wi-Fi, or Wi-Fi direct.

As noted above, the device 102 can switch between modes of operation, such as a transportation mode, a logistics mode, or a combination thereof. The transportation mode involves scenarios where a rider is being transported by the device 102. In the logistics mode, the device 102 is being used to deliver an object to a destination. The device 102 can perform both of these modes of use when a rider is on the device 102 and an object is being delivered through use of a container associated with the device 102.

In more detail, device 102 can include a frame 111 that integrates a capsule box (hereinafter container 113) that can be used to store objects for logistical transport. For example, the container 113 can store the personal belongings of a rider. In another example, the container 113 can be used to store objects, such as packages or letters for delivery. The container can include any enclosure that is configured to receive and/or retain contents, such as rider belongings, packages, and the like. The container 113 can be shaped to fit into an opening of the frame 111. In this example, the container 113 fits into an opening that is located centrally on the frame 111. In some instances, the container 113 can be a complete enclosure with a top, a bottom, and sides. In another example, the container 113 can be a partial enclosure having sides and a bottom, with an open top. The container 113 can be configured to lock into place relative to the frame 111 to prevent the container 113 from disassociating from the frame 111 during travel. The mechanism that locks the container 113 into position in the frame 113 can be located on the container 113 or the frame.

In use, the container 113 can be removed from the frame 111 to allow a user to place and/or remove objects therefrom. The container 113 can be placed back into the opening in the frame 111 for securement during use of the device 102. As noted above, a user can remove the container 113 from the frame 111 and place a package therein. The container 113 can be placed back into the opening of the frame 111. The device 102 can be driven to a location where the user (or a different user) can remove the container from the frame 111 and retrieve the package. The container 113 can be placed back into the frame 111. The frame 111 can be associated with any means of conveyance such as wheels.

The device 102 may further comprise a controller 114 (mobility device controller) and a power source 115 for powering an electric motor (not shown) to turn the wheels of the device 102. The power source 115 is also utilized to operate other electrical components of the device 102. In some instances, the device 102 also comprises a communications module 116, a camera 118, and a sensor platform 120. The controller 114 can comprise a processor 122 and memory 124. The processor 122 can be configured to execute instructions stored in memory 124. In some examples, the instructions are executed to perform any of the methods disclosed herein. When referring to operations performed by the controller 114, it will be understood that this includes the execution of instructions stored in memory 124 by the processor 122.

The sensor platform 120 can include various sensors such as cameras, LIDAR (light detection and ranging) sensors, ultrasonic sensors, infrared sensors, and/or other sensors that can be used to enable autonomous operation of the device 102. The controller 114 includes instructions stored in the memory 124 that enable the device 102 to operate autonomously. For example, the instructions can include navigation and/or mapping software. The controller 114 can obtain real-time location signals (such as GPS) from the communications module 116 and/or a dedicated location sensing component. Using sensor output obtained from the sensor platform 120, the controller 114 can navigate the device 102 from a current location to a destination using the real-time location information and real-time sensor output.

In one example, the communications module 116 may include a vehicle-to-everything (V2X or equivalent) module that allows the controller 114 to communicate with transportation infrastructure and/or IoT infrastructure elements over the network 112. The sensor platform can include any sensors that enable the controller 114 to detect the presence of a rider, a package, and/or the device's surroundings, such as additional cameras, microphones, LIDAR or other imaging systems, Radio Frequency identification (RFID, radar, and ultrasonic—just to name a few. The camera 118 can be used to obtain images of the device's surroundings and perform image recognition to identify infrastructure such as buses, buildings, elevators, and so forth. Example use cases will provide additional details regarding the capabilities of the device 102.

In general, the controller 114 can cause the device 102 to enter a passenger-carrying mode when a user interacts with the transportation device and requests a ride. For example, a rider can request use of the device 102 through their mobile device (not shown). The request can route through the service provider 104 for approval, in some instances. Other modes of operation of the device 102 are disclosed infra.

The service provider 104 can coordinate the actions and behaviors of a plurality of transportation devices. The service provider 104 can track the transportation devices across one or more locations and may reassign transportation devices from one location to another, based on demand. For example, the service provider 104 can determine the demand for a transportation device in a designated location. That is, the service provider 104 can receive requests for transportation services from users at that location. When requests exceed (or are likely to exceed) the number of transportation devices available in a location, the service provider 104 can determine there is an insufficient number of transportation devices in the designated location for the demand.

The service provider 104 can transmit a message to a transportation device through a transportation infrastructure. For example, the service provider 104 can transmit a request to the IoT infrastructure element 106 that can be relayed to the device 102. The IoT infrastructure element 106 can include an access point, repeater, or any other communications devices located in an area where transportation devices operate. The device 102 can communicate with the IoT infrastructure element 106 to receive a message from the service provider 104.

In some instances, rather than relaying messages through the IoT infrastructure elements or another element in the transportation infrastructure, the service provider 104 can transmit a request directly to the device 102 through a cellular connection. In general, the device 102 and the service provider 104 can communicate through any intermediary network in order to coordinate transportation and/or delivery services.

In one example, the service provider 104 can transmit a message to the device 102 that the device 102 is to relocate to a designated location. For example, if the device 102 is located in one area of a city, the service provider 104 can determine demand in a second area of the city and request that the device 102 route itself to the second area. To travel to the second area, the controller 114 can put the device 102 into a redistribution mode. When in redistribution mode, the controller 114 may ignore requests from users for ride services or package delivery.

In some instances, the second area may be outside a range distance of the device 102. For example, the device 102 may operate off a power source that has a range distance of ten miles. When a distance between where the device 102 is currently located and where it has been requested to relocate would cause the device 102 the power source 115 of the device 102 to have a SoC that is at or below a threshold range, the controller 114 of the device 102 can determine that the designated location is out of a range distance. In some instances, the service provider 104 may make this determination based on calculated distances and tracking of SoC for the device 102. That is, at any time, the device 102 can report back its operational status to the service provider 104. By way of example, the controller 114 may be configured to maintain a SoC of at least thirty percent, but to be sure, the specifics of the range threshold may be tuned according to desired device operating parameters.

To relocate the device 102, the service provider 104 may dispatch a transportation vehicle to a pick-location when the designated location is beyond the range distance of the device 102. As illustrated in FIGS. 1A, 1B, and 2 collectively, the service provider 104 may dispatch a transportation vehicle 108 such as a bus to a pickup location 126, such as a bus stop. The service provider 104 can instruct the device 102 to navigate to the pickup location 126. For example, the service provider 104 can transmit GPS coordinates to the device 102 of the pickup location 126. The controller 114 can cause the device 102 to autonomously navigate to the pickup location 126. Thus, the controller 114 can determine the device's current location and utilize navigation logic to direct the device 102 autonomously.

When the device 102 meets the transportation vehicle 108 at the pickup location 126, the controller 114 can communicate with the transportation vehicle 108 over a short-range wireless connection to board the transportation vehicle 108. In some instances, the device 102 can dock with charging stations or pads located on the transportation vehicle 108.

The transportation vehicle 108 can include a vehicle controller 200 having a processor 202 and memory 204. The processor 202 can be configured to execute instructions stored in memory 204. The instructions are executed to perform any of the methods disclosed herein. When referring to operations performed by the vehicle controller 200, it will be understood that this includes the execution of instructions stored in memory 204 by the processor 202. The transportation vehicle 108 can also include a communications interface 206 and a sensor platform 208. The sensor platform 208 can include, for example, cameras, location sensors, LIDAR, ultrasonic, radar, IR, and so forth. These sensors can be used to detect the presence, location, and movement of human passengers and transportation devices both inside and outside the transportation vehicle 108.

For example, the vehicle controller 200 can utilize the communications interface 206 to transmit data over a short-range wireless connection 212 to the device 102. The vehicle controller 200 can transmit messages to the device 102 that instruct the device 102 as to where to go on the bus based on available space. That is, the transportation vehicle 108 can include dedicated parking spaces for one or more devices, such as the device 102. One or more of these dedicated parking spaces can include a charging interface 210 that allows the device 102 to recharge itself as it is being transported to another location. Occupancy of device spaces in the transportation vehicle 108 can be determined by the vehicle controller 200 of the transportation vehicle 108 detecting when a device is parked and charging.

While some embodiments contemplate the device 102 being transported inside the transportation vehicle 108, the transportation vehicle 108 can also have external docks or enclosures that can receive transportation devices. These compartments can be located on a rear of the transportation vehicle 108, in some instances. Each compartment can include a charging station, such as the charging station disclosed with respect to the embodiments of FIG. 4.

In another example, the device 102 can request entry and transportation by the transportation vehicle 108 on an ad-hoc basis. That is, the device 102 can request to be repositioned by the transportation vehicle 108 with or without orchestration from the service provider 104. In some instances, the device 102 can share data with other transportation devices that are within short-range wireless communication distance. To be sure, transportation devices can also communicate with one another over long-range wireless communications as well. In one example use case, transportation devices can share repositioning data with one another and/or coordinate with one another to move to reposition into an area with greater user demand.

The device 102 can determine when demand in a particular area has decreased. By way of example, the controller 114 can determine that no requests to use the device 102 have been received in a set period of time. For example, if device 102 receives no user requests in thirty minutes, the controller 114 can choose to reposition the device 102. The period of time can vary according to operating parameters or learned from historical data. The device 102 could also use camera information. For example, if the controller 114 does not detect potential riders around the device 102 for a period of time, the controller can choose to reposition the device 102 to a more populated area.

Thus, when demand in a particular area decreases, the device 102 can return to a home or base location. Again, based on distance, this may involve using a transportation vehicle to return without over-depleting the power supply of the device 102. When no transportation vehicles are available, the device 102 can intelligently plot a path back to its home location using waypoint charging, where the device 102 can perform intermediate charging stops on the way back to its home location, or other another staging area.

In one use case, the controller 114 can determine that the designated location is beyond a range distance and cause the device to autonomously navigate to a pick-up location. The range distance can be affected by various factors, which include, but are not limited to traffic information, battery state-of-charge, terrain (e.g., grade of roads) weather conditions, and other parameters. The controller 114 can gather some or all of the data used in range distance calculations in real-time from sensors and/or from data obtained from third-party resources available through the network and/or the service provider. As noted herein, data can also be obtained from infrastructure elements, such as Internet-of-Things (IoT) infrastructure elements, examples of which are disclosed infra.

For example, the controller 114 can compare its current location with the designated location. The controller 114 can perform an estimated power usage calculation using a navigation path between the current location and the designated location. The controller 114 can cause the device to autonomously navigate into a transportation vehicle at the pick-up location. The transportation vehicle 108 transports the transportation device to a drop-off location that is in proximity to the designated location. While this example contemplates the controller 114 making determinations of range distance for the device 102, the service provider 104 can also make such determinations when coordinating the actions of the device 102.

Figure 3:
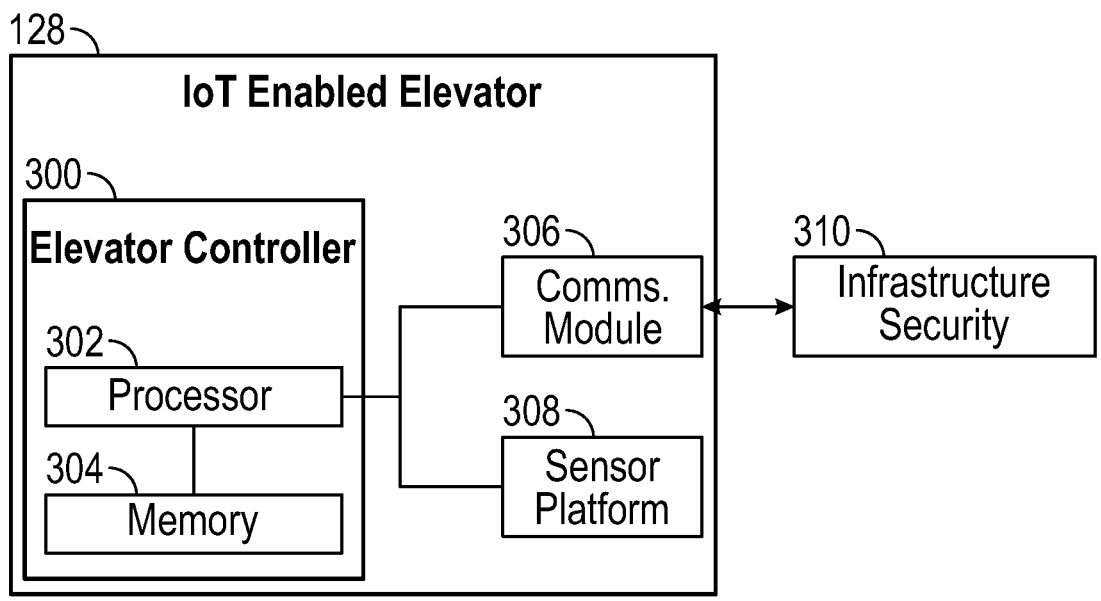
FIG. 3 illustrates an example use case where a transportation device is communicating with an IoT enabled infrastructure element during logistical package delivery.
Figure 3:
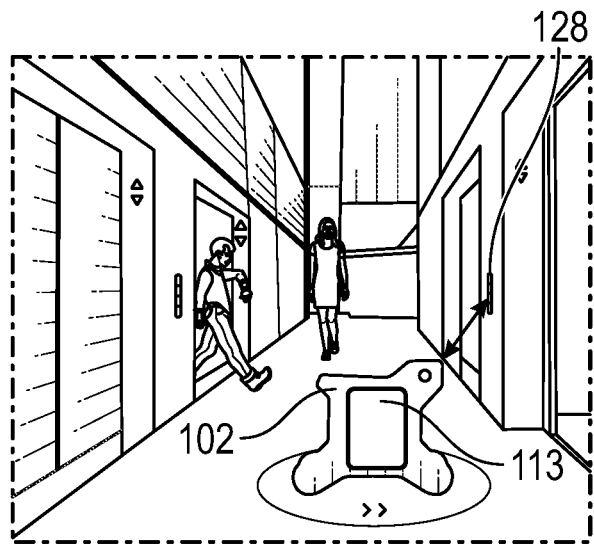

In another example use case, the device 102 can be configured to monitor for users exiting the transportation vehicle 108. For example, the device 102 can utilize sensor output of the sensor platform 120, and/or images obtained from the camera 118 to detect user presence. The device 102 can position itself or approach users exiting the transportation vehicle 108, who may need or have requested point-to-point mobility services provided by the device 102. Referring now to FIGS. 1A, 1B, and 3, when the device 102 is not being used as a ride service or is not being repositioned to another location, the device 102 can be utilized to transport objects. For example, the service provider 104 or a user can request use of the device 102 to transport an object, such as a package or a letter. In one example, a user can request package delivery using a mobile device, such as a Smartphone (or another equivalent device). The user can specify a delivery location for the package.

In one example, the service provider 104 can determine a lack of demand for the device 102 for passenger use and transmit a message to the device 102 that comprises a request to deliver an object to a delivery location. The controller 114 of the device 102 can activate a delivery mode to allow the device to autonomously navigate to the delivery location. In another example, the device 102 can switch to delivery mode when the device 102 has not received a request for a ride within a predetermined period of time.

As noted above, the device 102 can incorporate the container 113 that can receive the package. Once the package is secure, the device 102 can navigate to a delivery location. In FIG. 3, the delivery location may be within a building that includes various IoT infrastructure elements. For example, the device 102 can communicate with an IoT-enabled elevator 128 to obtain access to a floor or residence.

The IoT-enabled elevator 128 can include an elevator controller 300 having a processor 302 and memory 304. The processor 302 can be configured to execute instructions stored in memory 304. The instructions are executed to perform any of the methods disclosed herein. When referring to operations performed by the elevator controller 300, it will be understood that this includes the execution of instructions stored in memory 304 by the processor 302. The IoT-enabled elevator 128 can also include a communications module 306 and a sensor platform 308. The sensor platform 308 can include, for example, cameras, location sensors, LIDAR, ultrasonic, radar, IR, and so forth.

The device 102 can check in when entering the building by transmitting a message to the elevator controller 300. The elevator controller 300 can respond by authenticating and/or authorizing the device 102 to enter the building for package delivery (or other function(s)). In some instances, the elevator controller 300 can authenticate and/or authorize the device 102 through an infrastructure security system 310. The infrastructure security system 310 can maintain data for users and/or devices that have been permitted access to the building. In some instances, the service provider 104 can coordinate authorization for the device 102 prior to the device arriving at the building.

If authorized, the elevator controller 300 can transmit a floorplan or map of the building to the device 102. The device 102 can utilize this map to autonomously navigate to the desired destination inside the building.

In some instances, when the delivery location is secure or private, the service provider 104 (or user) can input authentication/authorization credentials that allow the device 102 to access the secure/private area. In sum, the service provider 104 can transmit authentication credentials to the device. The device can then provide the authentication credentials to an Internet-of-Things (IoT) infrastructure element to gain access to a secure or private location during delivery of an object, such as a package.

Using the example above, the controller 114 of the device 102 can transmit authentication credentials to the elevator controller 300 of the IoT enabled elevator 128, allowing the device 102 to access a restricted residential floor to deliver a package. Again, the controller 114 can communicate with the elevator controller 300 of the IoT-enabled elevator 128 using the communications module 116, which uses V2X communications.

Figure 4:
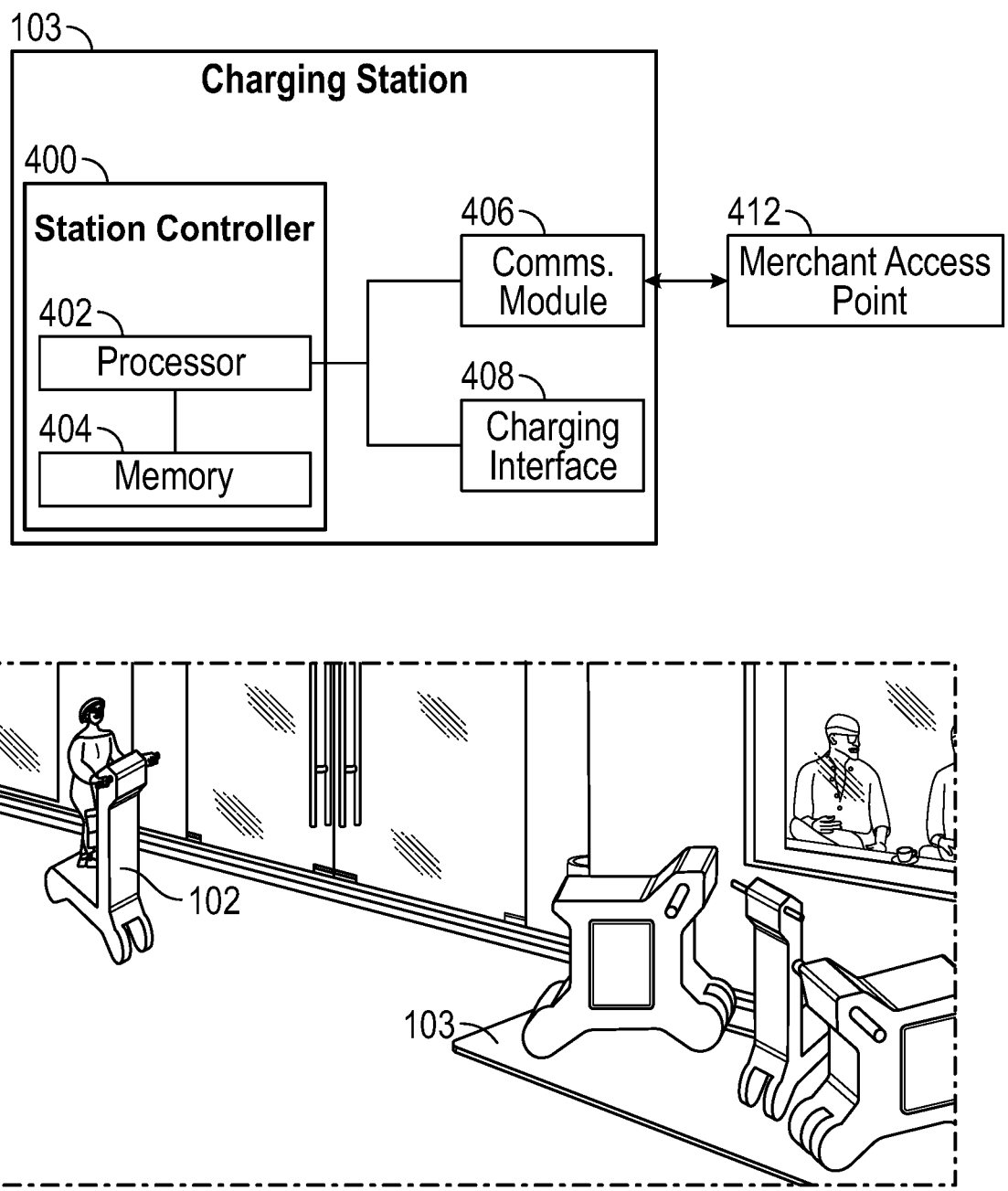
FIG. 4 illustrates an example use case where a transportation device autonomously engages with a charging station/pad.

Referring now to FIGS. 1A, 1B, and 4 collectively, the controller 114 can manage the SoC of the power source 115. The controller 114 can compare the SoC of the power source to a SoC threshold. When the SoC is at or below a SoC threshold, the controller 114 can cause the device to activate a charging mode. The controller 114 can autonomously navigate the device 102 to the charging station 103 for recharging. When in the charging mode, the controller 114 of the device 102 can identify the nearest (or most convenient depending on current use) charging location and cause the device to autonomously navigate to that charging location and dock with the charging location.

In FIG. 4, if the destination of a user operating the device 102 is at a charging station 103, then the user may go inside a retail store or restaurant while the transportation device 102 charges. A charging station 103 may be located inside a store or building, or on a sidewalk, such as illustrated in FIG. 4. In some instances, the charging station 103 may be an IoT enabled infrastructure element.

The charging station 103 can include a station controller 400 having a processor 402 and memory 404. The processor 402 can be configured to execute instructions stored in memory 404. The instructions are executed to perform any of the methods disclosed herein. When referring to operations performed by the station controller 400, it will be understood that this includes the execution of instructions stored in memory 404 by the processor 402. The charging station 103 can also include a communications interface 406.

The charging station 103 can include a charging interface 408 which can include a wired electrical connection or outlet. The device 102 can be plugged into the charging interface 408 through a cable. In another example, the charging interface 408 can include a wireless or inductive charging element that transfers electrical energy to a corresponding inductive charging element associated with the device 102.

In some instances, the station controller 400 can communicate with a merchant access point 412 who may sponsor the charging station 103. A merchant can subsidize charging of the device 102 for the charging station 103. In exchange, advertisements can be presented for display on a display unit (not shown) of the device 102 during charging. These advertisements can be transmitted to a mobile device of the user of the device 102 as well. In other examples, a monetary amount can be accrued for use of the charging station 103. The merchant can bill a user of the device 102 or the service provider 104. For example, when a user is using the device 102 for transportation and needs a charge, the user can be billed for use of the charging station 103. When the device 102 autonomously navigates to the charging station 103, an owner of the device 102, such as the service provider 104, may be billed for the use of the charging station 103.

In another example use case, when the device 102 has a sufficient SoC for the power source 115, but the device 102 is without a rider (could be temporary, for example, the rider stepped inside a building), the controller 114 can activate a power-saving mode and cause the device to autonomously navigate to a parking space to conserve the SoC. Thus, when a charging station is not present or is currently not needed, the device 102 can park to conserve power.

Figure 5:
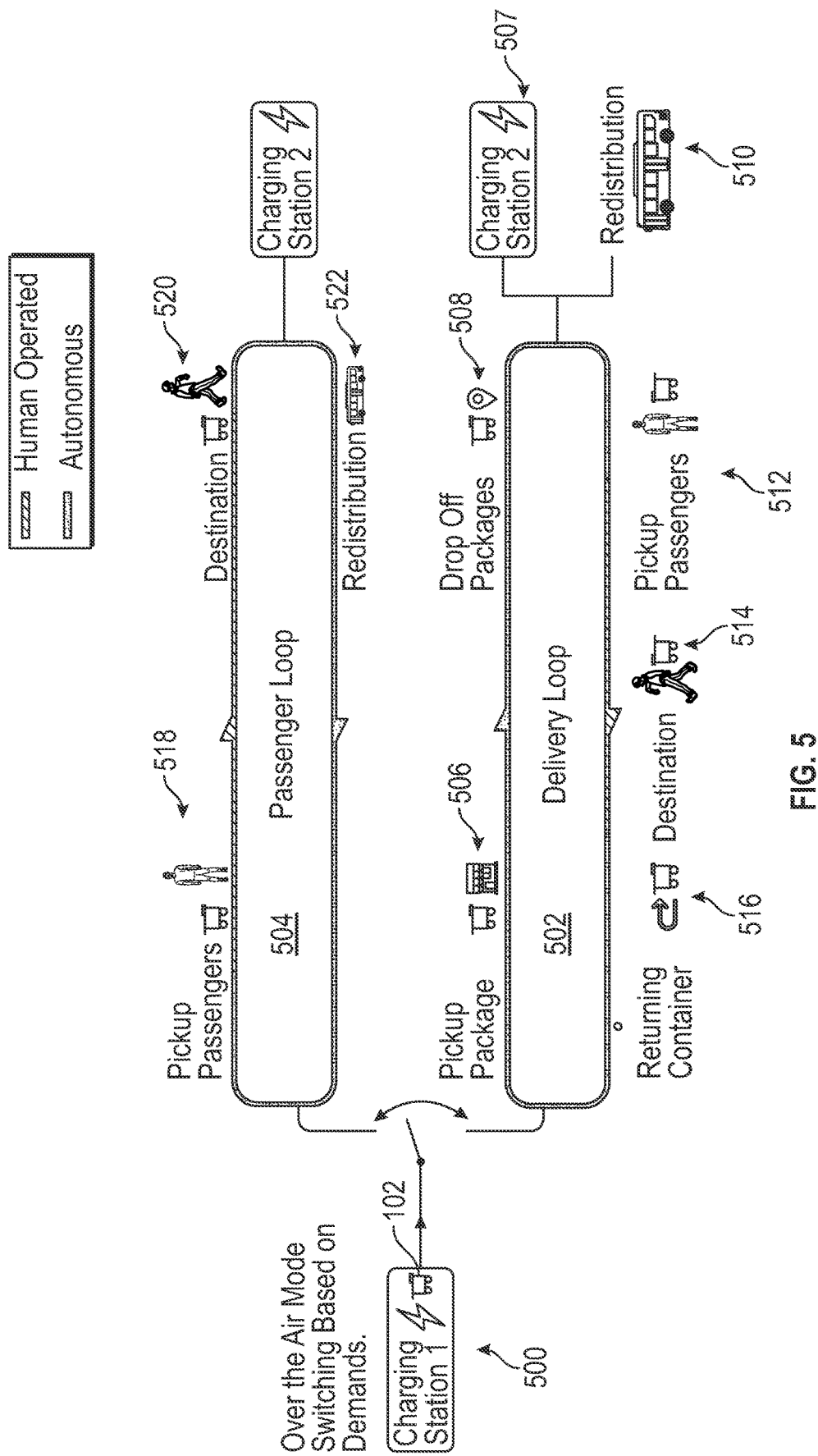
FIG. 5 schematically illustrates example routines for a transportation device.

FIG. 5 illustrates an example routing scenario where a transportation device can be directed to switch between various modes of operation. While some examples may reference functions performed by the device 102, aspects of these functions can also be performed by a service provider, and/or cooperatively between the device 102 and a service provider.

The device 102 can switch between a logistics mode routine 502 and a mobility service or ride routine 504. When in the logistics (e.g., package delivery) mode routine 502, the device 102 can depart a base or home charging station 500 to pick up packages at step 506 and drop off the packages at step 508. In more detail, the device 102 can receive a request to deliver a package to a destination (could be directly from a user or through a service provider). The request can include an origination address where the device 102 can be dispatched to pickup a package. The device 102 can autonomously navigate to the origination address to receive the package. A user can place a package into the container of the device 102. Once the package is received and the container is secure, the package is delivered to a destination as illustrated in step 508.

If the device 102 determines that its SoC is low, the device can autonomously navigate to a charging station at step 507 and then autonomously board a transportation vehicle for redistribution in step 510. The device can charge on the transportation vehicle when the transportation vehicle is so enabled. A passenger or rider is picked up at step 512 and drives the device 102 to a destination at step 514. The rider may have hailed the device 102 or requested the device through a service provider. In one example, the rider could be a passenger that was on the bus that was used to redistribute the device to a destination. The rider could also include an individual in an area of higher demand as determined by a service provider. Thus, when the device has been redistributed to an area of higher demand, the rider can be an individual that is in this area of higher demand.

After the rider exits at their destination, the device 102 can determine other users in the area have requested transportation and/or logistics service. If no user has requested the device 102 or the device has not been instructed by the service provider to relocated to another area, the device 102 can autonomously return a container or capsule used to store packages in step 516. The container could be returned to the original location where the package was received.

With respect to the mobility service or ride routine 504, the device autonomously navigates to pick up a requesting rider in step 518. As noted above, this can be based on demand as determined from a service provider that receives requests from users. The service provider can also determine user density in areas, which can indicate high demand. The rider can manually drive the device. However, the rider can also allow the device to autonomously navigate to a specified destination.

The rider then exits the device 102 at their destination at step 520. The device can determine if another user has requested transportation services once the rider has been dropped off. Although, even if another transportation service request has been received, the device can determine if it has sufficient charge to transport the rider to their destination. If the device does not have sufficient charge, the device can reject the transportation request and then autonomously navigate to another charging station. The device may receive a request to redistribute from a service provider. Assuming no transportation and/or logistics requests have been received in the area where the device has been charging, the device can be picked up by a bus for redistribution in step 522. That is, if the device receives a request for transportation services (either directly from a user through their mobile device or from the service provider), the device can choose to reject a request for redistribution from the service provider.

Figure 6:
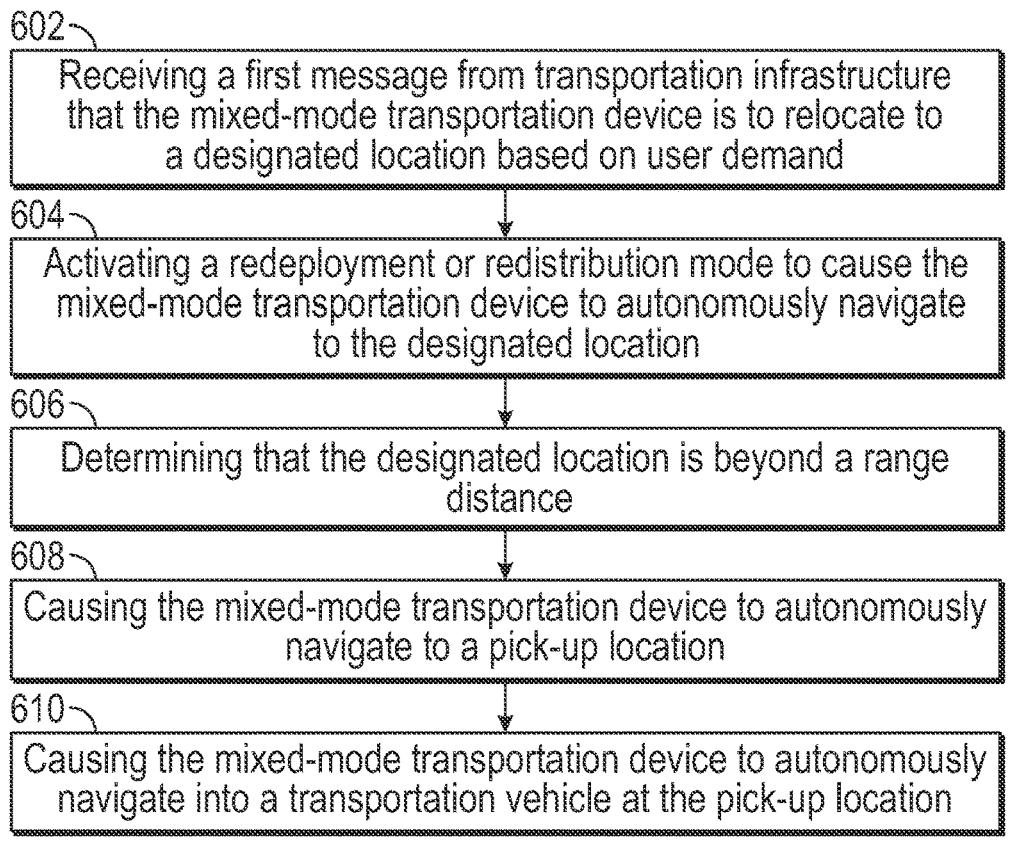
FIG. 6 is a flowchart of an example method of the present disclosure.

FIG. 6 is a flowchart of an example method that can be performed by a controller of a transportation device of the present disclosure. The method can include a step 602 of receiving a first message from transportation infrastructure that the transportation device is to relocate to a designated location based on user demand. Again, this message can originate with a service provider and be forwarded through transportation infrastructure, such as an IoT enabled infrastructure element in a building.

The method can further include a step 604 of activating a redeployment or redistribution mode to cause the transportation device to autonomously navigate to the designated location. Again, the device can be configured to monitor its current location in real-time and utilize navigation logic to determine a distance or path between the device and the designated location.

The method a step 606 of determining that the designated location is beyond a range distance. As noted above, this can include the controller measuring the distance or path between the device and the designated location and calculating if a range of the device would allow it to reach the designated location while preserving at least a portion of its SoC. Because the device is being redistributed based on demand, if the device were to arrive at the location with a depleted battery, the device would be of no use to riders.

If the designated location is too far away, the method can include a step 608 of causing the transportation device to autonomously navigate to a pick-up location. For example, the device can navigate to a bus stop. Next, the method can include a step 610 of causing the transportation device to autonomously navigate into a transportation vehicle at the pick-up location. As noted above, the bus can be IoT enabled, allowing the device and bus to communicate with one another. For example, the device can request entry to the bus. The transportation vehicle can transport the transportation device to a drop-off location that is in proximity to the designated location.

Figure 7:
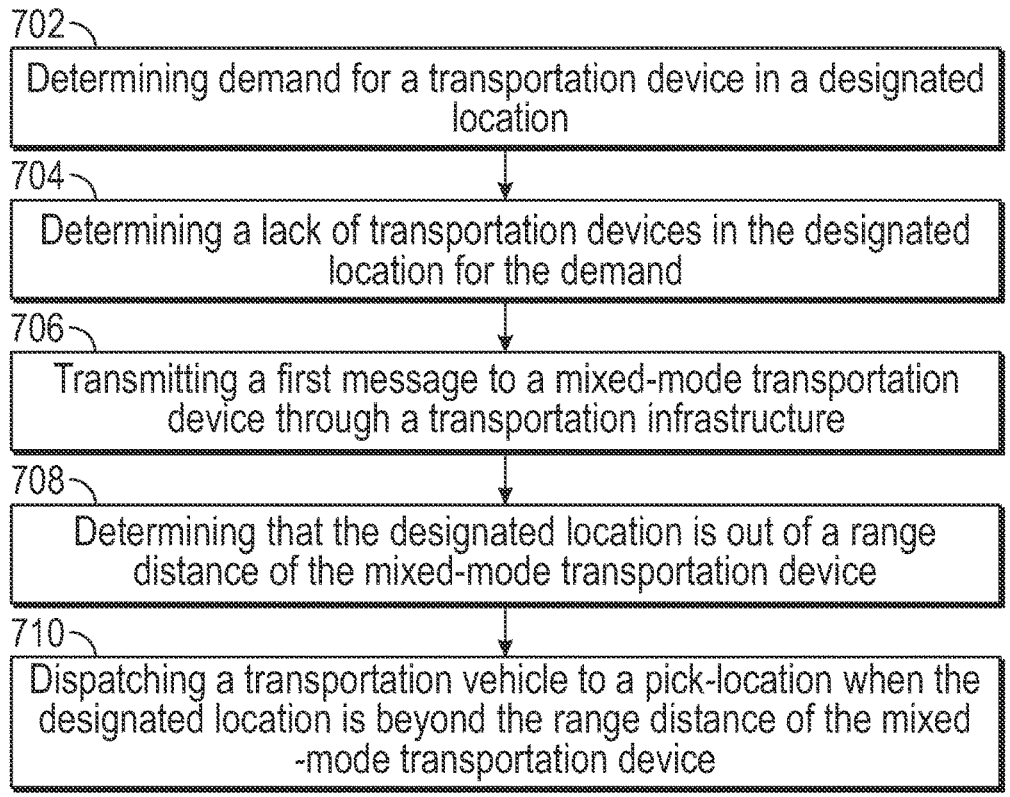
FIG. 7 is a flowchart of another example method of the present disclosure.

FIG. 7 is a flowchart of an example method performed by service provider of the present disclosure. The method can include a step 702 of determining a demand for a transportation device in a designated location. For example, the service provider can receive requests for mobility services from mobile devices of users in a particular geographical area. The service provider can also determine that there are insufficient mobility devices available in this geographical area. Thus, once demand has been determined, the method can include a step 704 of determining a lack of transportation devices in the designated location for the demand. In some instances, each of the mobility devices can report its location in real-time or near-real-time to the service provider.

The method can include a step 706 of transmitting a first message to a transportation device through a transportation infrastructure. In some instances, the first message indicates that the transportation device is to relocate to the designated location. The method can also include a step 708 of determining that the designated location is out of a range distance of the transportation device, as well as a step 710 of dispatching a transportation vehicle to a pick-location when the designated location is beyond the range distance of the transportation device. Also, as noted above, the service provider can direct the transportation device to enter various modes based on need. The service provider can redirect the transportation device into a logistics mode, a charging mode, a parking mode, and other modes based on need.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems, and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A method, comprising:
   determining demand for a transportation device in a designated location;
   determining a lack of transportation devices in the designated location for the demand;
   transmitting a first message to a transportation device through a transportation infrastructure, the first message indicating that the transportation device is to relocate to the designated location;
   determining that the designated location is out of a range distance of the transportation device; and
   dispatching a transportation vehicle to a pick-up location when the designated location is beyond the range distance of the transportation device, the transportation vehicle transporting the transportation device atto the designated location.

2. The method according to claim 1, further comprising:
   determining a lack of demand for the transportation device for passenger use; and
   transmitting a second message to the transportation device that comprises a request to deliver an object to a delivery location, the transportation device activating a delivery mode to cause the transportation device to autonomously navigate to the delivery location.

3. The method according to claim 2, further comprising transmitting authentication credentials to the transportation device, the transportation device providing the authentication credentials to an Internet-of-Things (IoT) infrastructure element to gain access to a secure or private location during delivery of an object.

4. The method according to claim 1, further comprising transmitting a passenger ride request to the transportation device, the transportation device activating a passenger carrying mode when a user interacts with the transportation device.

5. The method according to claim 1, further comprising:
   comparing a state-of-charge (SoC) of a power source of the transportation device to a SoC threshold; and
   causing the transportation device to activate a charging mode and causing the transportation device to autonomously navigate to a charging location and dock with the charging location when the SoC is at or below a SoC threshold.

6. The method according to claim 5, further comprising causing the transportation device to activate a power-saving mode and causing the transportation device to autonomously navigate to a parking space to conserve the SoC.

* * * * *